United States Patent
Miller et al.

(10) Patent No.: US 9,702,568 B2
(45) Date of Patent: Jul. 11, 2017

(54) METHOD AND SYSTEM FOR OPERATING A WATER HEATER APPLIANCE

(71) Applicant: General Electric Company, Schenectady, NY (US)

(72) Inventors: Jeremy Michael Miller, Louisville, KY (US); Michael Thomas Beyerle, Pewee Valley, KY (US); Thomas Charles Zimmer, La Grange, KY (US); Robert Marten Bultman, Louisville, KY (US); Myles Caley, La Grange, KY (US)

(73) Assignee: Haier US Appliance Solution, Inc., Wilmington, DE (US)

( * ) Notice: Subject to any disclaimer, the term of this patent is extended or adjusted under 35 U.S.C. 154(b) by 654 days.

(21) Appl. No.: 13/716,694

(22) Filed: Dec. 17, 2012

(65) Prior Publication Data

US 2014/0169773 A1    Jun. 19, 2014

(51) Int. Cl.
| | | |
|---|---|---|
| *F24H 1/00* | (2006.01) | |
| *F24D 17/00* | (2006.01) | |
| *F24H 9/20* | (2006.01) | |
| *F24D 19/10* | (2006.01) | |
| *G05D 23/19* | (2006.01) | |

(52) U.S. Cl.
CPC ..... *F24D 17/0073* (2013.01); *F24D 19/1051* (2013.01); *F24H 9/2021* (2013.01); *G05D 23/1904* (2013.01)

(58) Field of Classification Search
CPC ....................................................... F24H 1/00
USPC ...... 392/311, 449, 441, 452–496; 122/13.01, 122/14.1, 14.2, 14.22
See application file for complete search history.

(56) References Cited

U.S. PATENT DOCUMENTS

| | | | |
|---|---|---|---|
| 5,086,385 A * | 2/1992 | Launey et al. ................. 700/83 |
| 5,103,078 A * | 4/1992 | Boykin et al. ................ 219/494 |
| 5,808,277 A * | 9/1998 | Dosani et al. ................ 219/481 |
| 6,282,370 B1 * | 8/2001 | Cline et al. ................... 392/465 |
| 6,375,087 B1 | 4/2002 | Day et al. |
| 7,015,432 B2 * | 3/2006 | Valbh .................... F24H 9/2007 |
| | | | 219/486 |
| 2003/0109938 A1* | 6/2003 | Daum et al. ................... 700/11 |
| 2004/0177817 A1* | 9/2004 | Bradenbaugh ............. 122/13.01 |
| 2008/0251373 A1* | 10/2008 | Oke ............................... 203/11 |
| 2010/0195991 A1* | 8/2010 | Deivasigamani et al. .... 392/308 |
| 2010/0206869 A1* | 8/2010 | Nelson et al. ................ 219/494 |
| 2011/0015802 A1* | 1/2011 | Imes ............................. 700/300 |
| 2012/0060771 A1 | 3/2012 | Brian et al. |

* cited by examiner

*Primary Examiner* — Michael Laflame, Jr.
(74) *Attorney, Agent, or Firm* — Dority & Manning, P.A.

(57) ABSTRACT

A method and system for operating a water heater appliance are provided. The method and system include initiating a vacation mode of the water heater appliance. An operating temperature of the water heater appliance is reduced from a normal operating temperature to a vacation operating temperature in the vacation mode of the water heater appliance. The method and system also include sanitizing the water heater appliance by raising the operating temperature of the water heater appliance from the vacation operating temperature to a sanitization operating temperature.

11 Claims, 4 Drawing Sheets

METHOD AND SYSTEM FOR OPERATING A WATER HEATER APPLIANCE

FIELD OF THE INVENTION

The present subject matter relates generally to water heater appliances and methods for operating the same.

BACKGROUND OF THE INVENTION

Certain water heater appliances operate such that water with the water heater's tank is maintained at a predetermined temperature. Generally, a user can select the predetermined temperature using a dial or other input on the water heater. Such water heater appliances can continue to hold water located with the water heater's tank at the predetermined temperature until the predetermined temperature is changed or the water heater appliance is deactivated. Accordingly, such water heater appliances can be inefficient. In particular, when a residence housing the water heater appliance is unoccupied, heated water from a water heater appliance is generally unneeded. Thus, despite no demand for heated water, the water heater appliance can continue to operate and heat water located within the water heater's tank. Such operations can waste valuable energy.

To alleviate such energy waste, certain water heater appliances are deactivated when no heated water is needed, e.g., when residents are on vacation. However, deactivating a water heater appliance for an extended period of time has certain drawbacks. In particular, water within the water heater's tank can degrade over time until the water is unsanitary, e.g., certain bacteria can propagate within the water heater's tank when the water heater appliance is deactivated for extended periods of time. Thus, the water heater's tank should be drained prior to reactivating the water heater appliance in order to remove the unsanitary water therein. Such draining can be time consuming and inconvenient.

Accordingly, a method and system for assisting with maintaining sanitary water within a water heater appliance during periods of low heated water demand would be useful.

BRIEF DESCRIPTION OF THE INVENTION

The present subject matter provides a method and system for operating a water heater appliance. The method and system include initiating a vacation mode of the water heater appliance. An operating temperature of the water heater appliance is reduced from a normal operating temperature to a vacation operating temperature in the vacation mode of the water heater appliance. The method and system also include sanitizing the water heater appliance by raising the operating temperature of the water heater appliance from the vacation operating temperature to a sanitization operating temperature. Additional aspects and advantages of the invention will be set forth in part in the following description, or may be apparent from the description, or may be learned through practice of the invention.

In a first exemplary embodiment, a method for operating a water heater appliance is provided. The method includes initiating a vacation mode of the water heater appliance in which an operating temperature of the water heater appliance is reduced from a normal operating temperature to a vacation operating temperature, maintaining the water heater appliance in the vacation mode at the vacation operating temperature for a predetermined time period, and starting a sanitization mode of the water heater appliance after the predetermined time period has elapsed. The operating temperature of the water heater appliance rising from the vacation operating temperature to a sanitization operating temperature in the sanitation mode. The method further includes keeping the water heater appliance in the sanitization mode at the sanitization operating temperature for a period of time and returning the water heater appliance to the vacation mode after the period of time has elapsed.

In a second exemplary embodiment, a method for operating a water heater appliance is provided. The method includes initiating a vacation mode of the water heater appliance in which an operating temperature of the water heater appliance is reduced from a normal operating temperature to a vacation operating temperature, determining a vacation mode duration and calculating a sanitization schedule for the water heater appliance based at least in part on the vacation mode duration and a sanitization time interval. The sanitization schedule has at least one sanitization operation. The method further includes starting the sanitization operation of the water heater appliance based upon the sanitization schedule. The operating temperature of the water heater appliance rises from the vacation operating temperature to a sanitization operating temperature during the at least one sanitation operation. The method further includes returning the water heater appliance to the vacation mode after completion of the at least one sanitization operation.

In a third exemplary embodiment, a system for operating a water heater appliance is provided. The system includes a heating element positioned within the water heater appliance, a user input, and a controller in communication with the heating element and the user input. The controller is configured for receiving a vacation mode initiation signal from said user input and initiating a vacation mode of the water heater appliance based upon the vacation mode initiation signal. An operating temperature of the water heater appliance is reduced from a normal operating temperature to a vacation operating temperature in the vacation mode. The controller is also configured for activating the heating element after a predetermined period of time has elapsed after the step of initiating. The heating element raises the operating temperature of the water heater appliance from the vacation operating temperature to a sanitization operating temperature during the step of activating. The controller is also configured for adjusting the heating element in order to return the operating temperature of the water heater appliance from the sanitization operating temperature to the vacation operating temperature.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
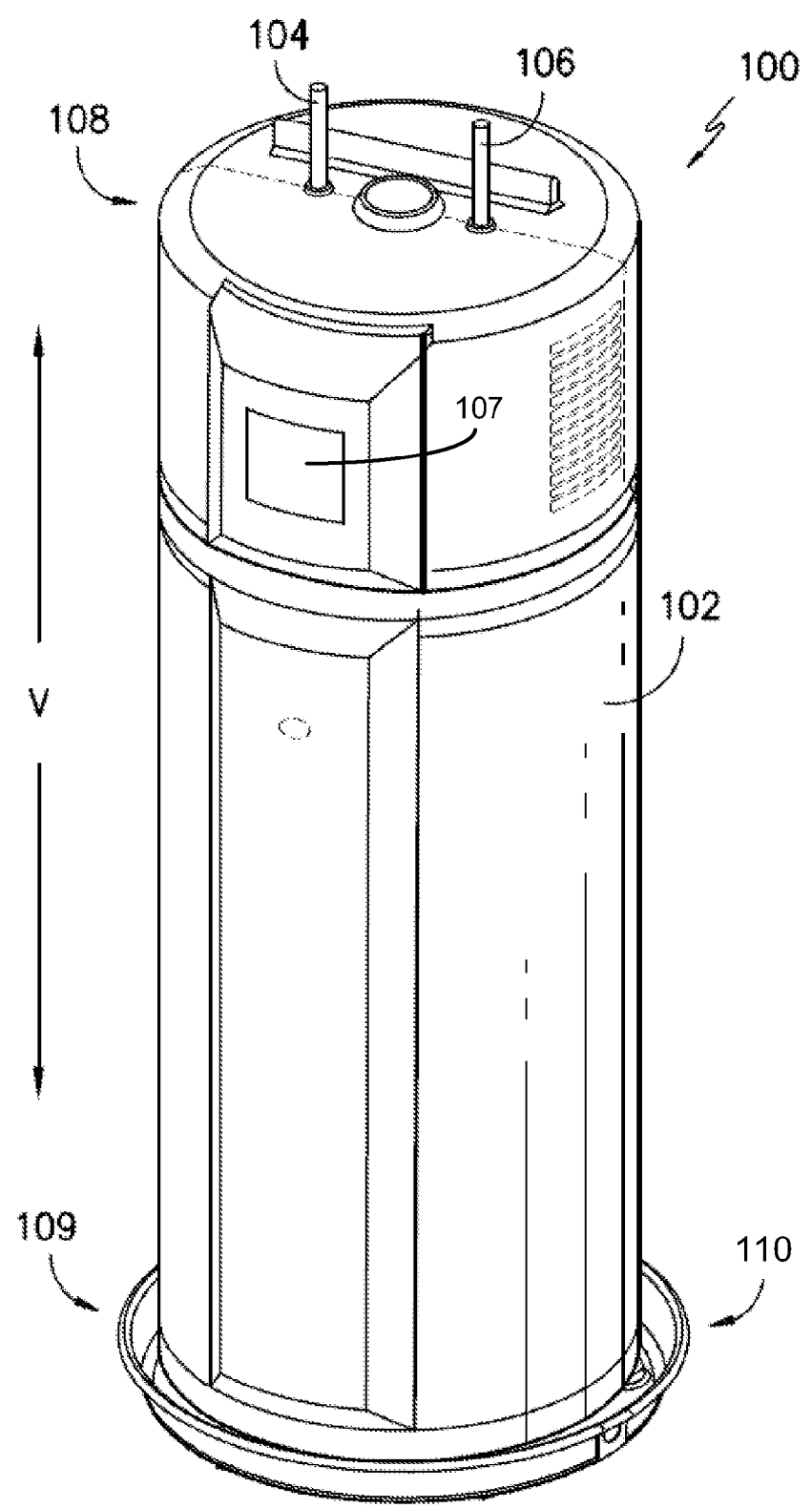
FIG. 1 provides a perspective view of a water heater appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes a casing 102. A tank (not shown) and a heating element 105 (FIG. 2) are mounted within casing 102 for heating water therein. Heating element 105 may be a gas burner, an electric resistance element, a microwave element, an induction element, or any other suitable heating element or combination thereof Water heater appliance 100 also includes a cold water conduit 104 and a hot water conduit 106 that are both in fluid communication with the tank within casing 102. As an example, cold water from a water source, e.g., a municipal water supply or a well, can enter water heater appliance 100 through cold water conduit 104. From cold water conduit 104, such cold water can enter the tank wherein it is heated with heating element 105 to generate heated water. Such heated water can exit water heater appliance 100 at hot water conduit 106 and, e.g., be supplied to a bath, shower, sink, or any other suitable feature.

Water heater appliance 100 extends longitudinally between a top portion 108 and a bottom portion 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100.

A drain pan 110 is positioned at bottom portion 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator (not shown) of water heater appliance 100. It should be understood that water heater appliance 100 is provided by way of example only and that the present subject matter may be used with any suitable water heater appliance.

As will be understood by those skilled in the art, during normal operation of water heater appliance 100, heating element 105 (FIG. 2) operates to heat and maintain water with water heater appliance 100 at a normal operating temperature, e.g., between about one-hundred degrees Fahrenheit and about one-hundred and forty degrees Fahrenheit. However, when a user of water heater appliance 100 goes on vacation or is away from water heater appliance 100 for a long period of time, e.g., more than about fourteen days, continuous operation of water heater appliance 100 at the normal operating temperature can be wasteful or inefficient due to decreased demand for heater water from water heater appliance 100. In particular, operating water heater appliance 100 in order to maintain the large volume of water within water heater appliance 100 at the normal operation temperature can be expensive and energy intensive relative to the demand for heated water.

The present subject matter permits or assists water heater appliance 100 with operating at a vacation operating temperature that is less than the normal operating temperature, e.g., in order to avoid operating unnecessarily at the normal operating temperature. For example, the vacation operating temperature may be between about forty degrees Fahrenheit and about sixty degrees Fahrenheit, between about forty-five degrees Fahrenheit and about fifty-five degrees Fahrenheit, or between about forty degrees Fahrenheit and about eighty degrees Fahrenheit. By operating at the vacation operating temperature rather than the normal operating temperature, a cost of operating water heater appliance 100 can be reduced during the vacation or any other time a user of water heater appliance 100 is away or demand for heated water is reduced.

However, water within water heater appliance 100 at the vacation operating temperature can become unsanitary over time. Such unsanitary water can be unusable and inconvenient to dispose of or replace. Thus, the present subject matter also assists with keeping water within water heater appliance 100 sanitary during the vacation.

Figure 2:
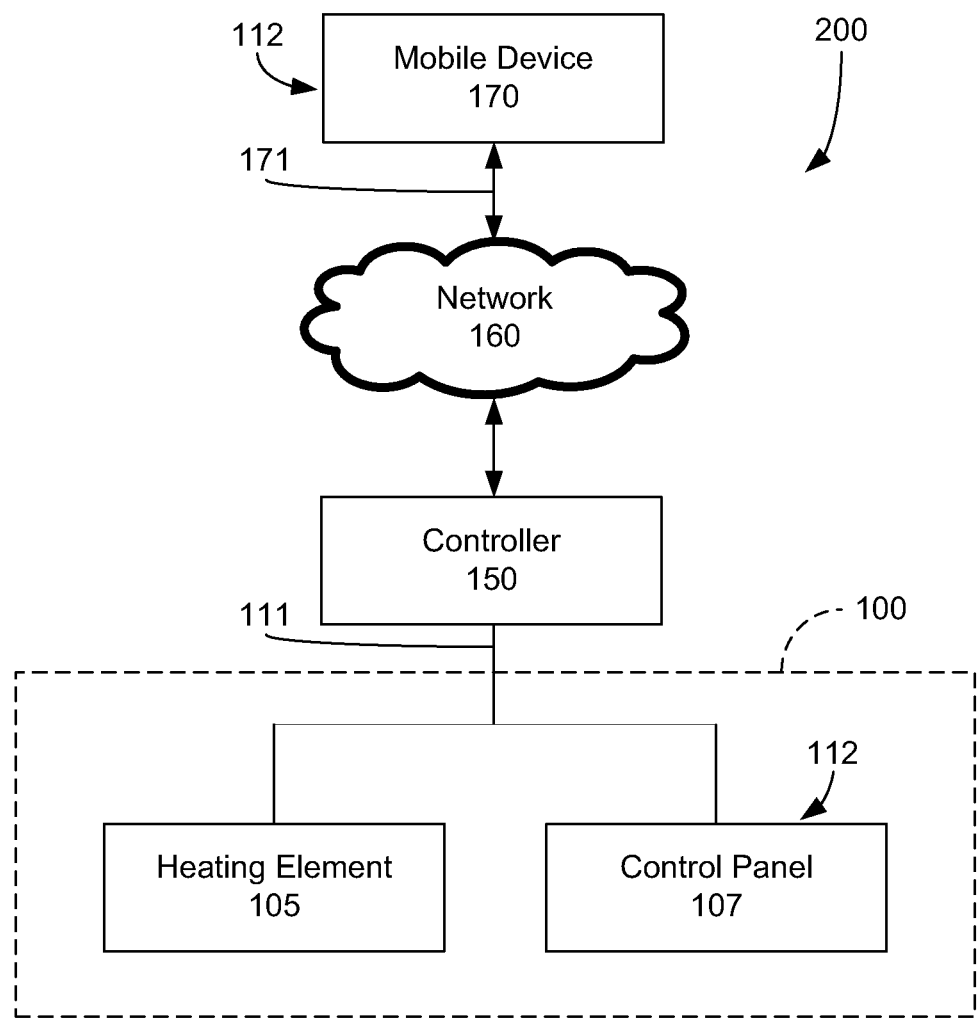
FIG. 2 provides a schematic view of a system for operating a water heater appliance according to an exemplary embodiment of the present subject matter.

FIG. 2 provides a schematic view of a system 200 for operating water heater appliance 100 according to an exemplary embodiment of the present subject matter. System 200 is configured for operating water heater appliance 100 during periods of low heated water demand. In particular, system 200 can operate water heater appliance 100 while users of water heater appliance 100 are on a vacation or away from water heater appliance 100 for a long period of time, e.g., more than about fourteen days. System 200 can operate water heater appliance 100 such that water heater appliance 100 provides sanitary and clean water despite such long periods of water heater appliance 100 inactivity or low power output. It should be understood that system 200 may be used to operate any other suitable water heater appliance.

System 200 includes heating element 105, user inputs 112, and a controller 150. As discussed above heating element 105 is positioned within water heater appliance 100 and configured for heating water therein. User inputs 112 permit a user to operate controller 150 and/or water heater appliance 100. User inputs 112 include a control panel 107 mounted to water heater appliance 100 and a mobile device 170. Control panel 107 may be any type of interface such as a touch screen, knobs, sliders, buttons, speech recognition, etc., mounted to water heater appliance 100 that permits a user to input control commands for water heater appliance 100 and/or controller 150. Similarly, mobile device 170 permits a user to input control commands for water heater appliance 100 and/or controller 150.

Mobile device 170 may be a smartphone or any other suitable device, such as a personal computer, cell phone, laptop, PDA, tablet, or other computing device. Mobile device 170 includes appropriate input and output devices, such as a display screen, touch screen, touch pad, data entry keys, speakers, and/or a microphone suitable for voice recognition. Mobile device 170 also includes a network interface 171 for accessing information over a network 160. Network 160 can include a combination of networks, such as cellular network, WiFi network, LAN, WAN, the Internet, and/or other suitable network and can include any number of wired or wireless communication links. For instance, mobile device 170 can communicate through a cellular network using a WAP standard or other appropriate communication protocol. The cellular network could in turn communicate with the Internet, either directly or through another network.

Controller 150 is in, e.g., operative, communication with user inputs 112 and heating element 105. Thus, controller 150 can selectively activate heating element 105 based upon signals from user inputs 112. Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 may be position at a variety of locations. In the exemplary embodiment shown in FIG. 2, controller 150 is positioned away from water heater appliance 100 and communicates with water heater appliance 100 over a wireless connection 111. However, in alternative exemplary embodiments, controller 150 may communicate with water heater appliance 100 via any suitable connection, such as a wired connection. Also, in additional alternative exemplary embodiments, controller 150 may be positioned within water heater appliance 100, e.g., as an integral component of water heater appliance 100.

Controller 150 can include a time keeping mechanism (not shown) that provides information to controller 150 and/or a user regarding the current time of the day. The time keeping mechanism also includes a calendar function to provide information regarding the day of the week and the current date. A user can set the time keeping mechanism manually, or the time keeping mechanism can set automatically, e.g., via synchronization to an atomic clock radio signal.

As discussed above, controller 150 is in communication with heating element 105 and user inputs 112. As an example, controller 150 may receiving a vacation mode initiation signal from one of user inputs 112, e.g., control panel 107 or mobile device 170. Based upon the vacation mode initiation signal, controller 150 initiates a vacation mode of water heater appliance 100. An operating temperature of water heater appliance 100 is reduced from the normal operating temperature to the vacation operating temperature in the vacation mode. Controller 150 can reduce a power output of heating element 105 during the vacation mode in order to reduce the operating temperature of water heater appliance 100. By operating water heater appliance 100 at the vacation operating temperature, an energy demand of water heater appliance 100 can be reduced.

Controller 150 is also configured for activating heating element 105 after a predetermined period of time has elapsed after the vacation mode is initiated. Controller 150 activates heating element 105 in order to raise the operating temperature of water heater appliance 100 from the vacation operating temperature to a sanitization operating temperature. The sanitization operating temperature is selected such that it is high enough to assist with keeping water within water heater appliance 100 sanitary, e.g., with hindering growth of bacteria within such water.

Controller 150 also adjusts heating element 105 in order to return the operating temperature of water heater appliance 100 from the sanitization operating temperature to the vacation operating temperature, e.g., after water within water heater appliance 100 has been sanitized. In such a manner, water within water heater appliance 100 can be kept sanitary, e.g., despite maintaining such water at the relatively low vacation operating temperature during most of the vacation mode. Controller 150 can also receive a vacation mode termination signal from one of user inputs 112 and start the normal operating mode of water heater appliance 100 based upon the vacation mode termination signal.

Figure 3:
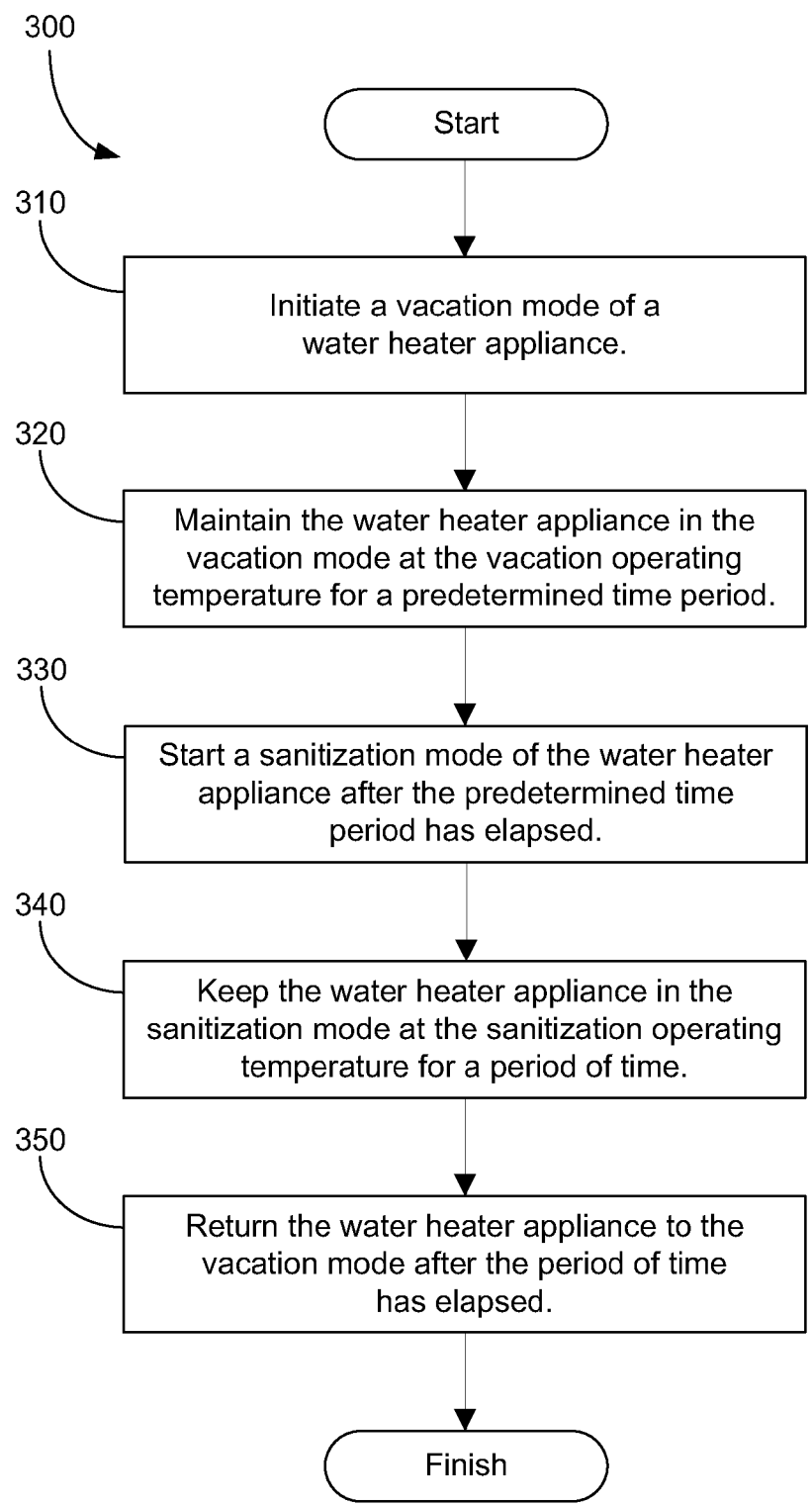
FIG. 3 provides a method for operating a water heater appliance according to an exemplary embodiment of the present subject matter.

FIG. 3 provides a method 300 for operating a water heater appliance, such as water heater appliance 100, according to an exemplary embodiment of the present subject matter. Method 300 can be implemented by controller 150 of system 200. Method 300 can permit water heater appliance 100 to operate efficiently and sanitarily during a vacation mode of water heater appliance 100 as discussed in greater detail below.

At step 310, controller 150 initiates a vacation mode of water heater appliance 100. As an example, a user can utilize user inputs 112 to signal controller 150 to initiate the vacation mode, e.g., when the user is leaving for more than about fourteen days. In the vacation mode, an operating temperature of water heater appliance 100 is reduced from a normal operating temperature, e.g., between about one-hundred and one hundred and forty degrees Fahrenheit, to a vacation operating temperature. In various exemplary embodiments, the vacation operating temperature may be any suitable temperature, e.g., between about forty degrees Fahrenheit and about sixty degrees Fahrenheit or about fifty degrees Fahrenheit. As an example, controller 150 can adjust a power output or duty cycle of heating element 105 to reduce the operating temperature of water heater appliance 100 from the normal operating temperature to the vacation operating temperature.

It should be understood that when water heater appliance 100 is operating in the vacation operating temperature, water within water heater appliance 100 need not be at the vacation operating temperature. For example, if the ambient temperature is seventy degrees Fahrenheit, water within water heater appliance 100 can also be at seventy Fahrenheit, despite water heater appliance 100 operating at the vacation operating temperature, e.g., about fifty degrees Fahrenheit. Thus, water heater appliance 100 may not heat water therein when the ambient temperature is greater than the vacation operating temperature. Accordingly, the vacation operating temperature can be selected as a lowest allowable or lowest preferred temperature, e.g., in order to prevent freezing within water heater appliance 100 during a vacation.

At step 320, controller 150 maintains water heater appliance 100 in the vacation mode at the vacation operating temperature for a predetermined time period. The predetermined time period may be any suitable time period. In one exemplary embodiment, the predetermined time period is less than about fourteen days.

At step 330, controller 150 starts a sanitization mode of water heater appliance 100, e.g., after the predetermined time period has elapsed. In the sanitization mode, the operating temperature of water heater appliance 100 rises from the vacation operating temperature to a sanitization operating temperature. The sanitization operating temperature may be any suitable temperature. In one exemplary embodiment, the sanitization operating temperature is greater than about one-hundred and twenty degrees Fahrenheit. As an example, controller 150 can adjust a power output or duty cycle of heating element 105 to raise the operating temperature of water heater appliance 100 from the vacation operating temperature to the sanitization operating temperature.

At step 340, controller 150 keeps water heater appliance 100 in the sanitization mode at the sanitization operating temperature for a period of time. The period of time can be any suitable time interval. In one exemplary embodiment, the period of time is greater than about one hour. By keeping water within water heater appliance 100 at the sanitization operating temperature, bacteria within such water can be eliminated and hygiene of such water can be improved or maintained.

It should be understood that the period of time can vary based upon the vacation operating temperature. In particular, the vacation operating temperature can be negatively proportional to the period of time. As an example, the period of time can be about forty-five minutes when the vacation operating temperature is about one-hundred and fifty degrees Fahrenheit. Conversely, as another example, the period of time can be about twenty minutes when the vacation operating temperature is about one-hundred and sixty degrees Fahrenheit.

At step 350, controller 150 returns water heater appliance 100 to the vacation mode after the period of time has elapsed. Thus, after the sanitization mode has had sufficient time to sanitize water within water heater appliance 100, controller 150 can return water heater appliance 100 to the vacation operating temperature, e.g., in order to reduce the energy consumption of water heater appliance 100.

In additional exemplary embodiments, controller 150 can also maintain water heater appliance 100 in the vacation mode at the vacation operating temperature for an additional predetermined time period after step 350. After the additional predetermined time period has elapsed, controller 150 can start an additional sanitization mode of water heater appliance 100. During the additional sanitization mode, controller 150 can keep water heater appliance 100 at the sanitization operating temperature for an additional period of time. After the additional period of time has elapsed, controller 150 can restore water heater appliance 100 to the vacation mode. Thus, e.g., controller 150 can initiate the sanitization mode at least every fourteen days in order to sanitize or maintain a sanitization of water within water heater appliance 100.

Figure 4:
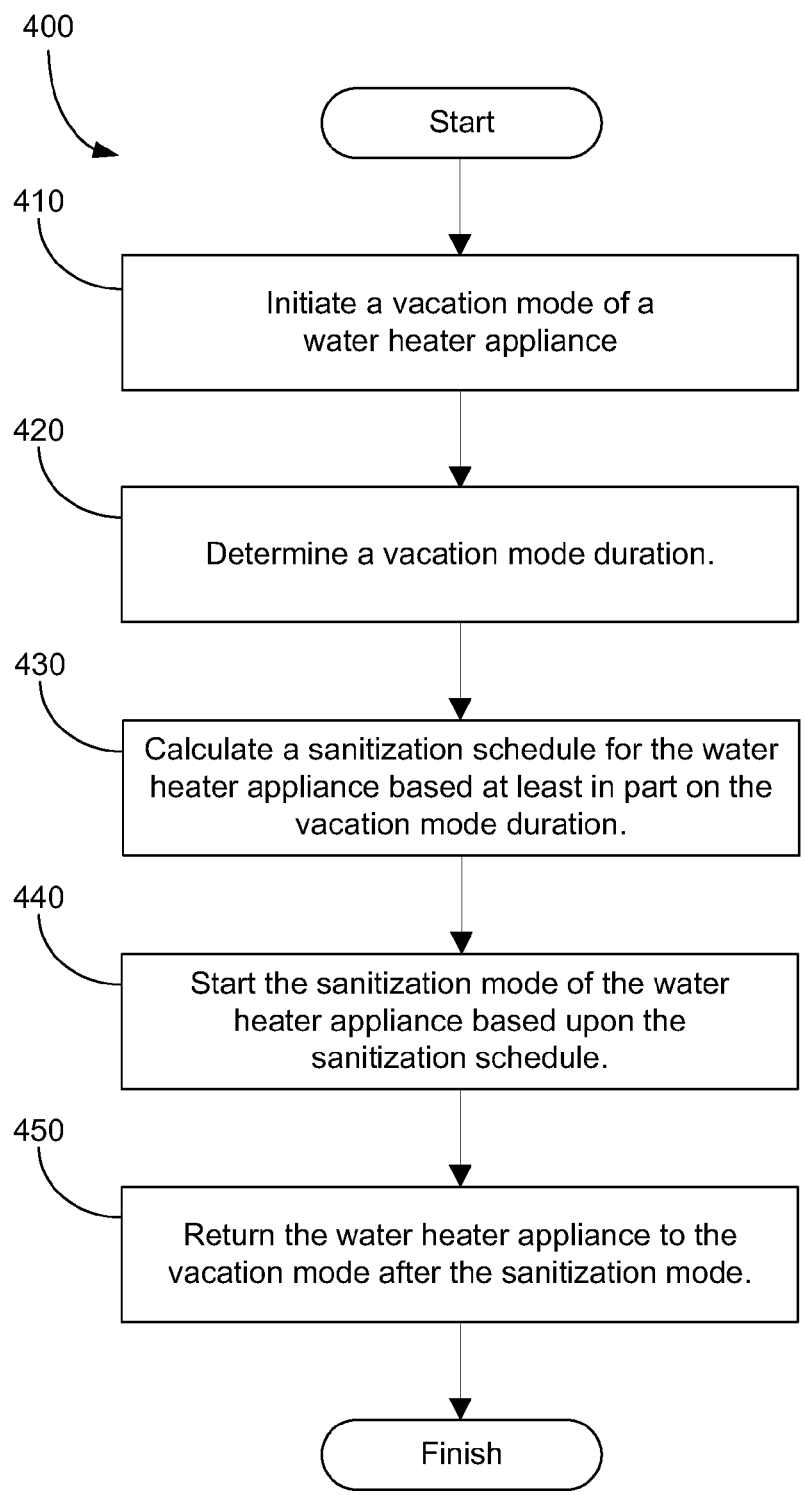
FIG. 4 provides a method for operating a water heater appliance according to an additional exemplary embodiment of the present subject matter.

FIG. 4 provides a method 400 for operating a water heater appliance, e.g., water heater appliance 100, according to an additional exemplary embodiment of the present subject matter. Method 400 can be implemented by controller 150 of system 200. Method 400 can permit water heater appliance 100 to operate efficiently and sanitarily during a vacation mode of water heater appliance 100 as discussed in greater detail below.

At step 410, controller 150 initiates a vacation mode of water heater appliance 100. As an example, a user can utilize user inputs 112 to signal controller 150 to initiate the vacation mode, e.g., when the user is leaving for more than about fourteen days. In the vacation mode, an operating temperature of water heater appliance 100 is reduced from a normal operating temperature, e.g., about one-hundred and twenty degrees Fahrenheit, to a vacation operating temperature. In various exemplary embodiments, the vacation operating temperature may be any suitable temperature, e.g., between about forty degrees Fahrenheit and about sixty degrees Fahrenheit or about fifty degrees Fahrenheit. As an example, controller 150 can adjust a power output or duty cycle of heating element 105 to reduce the operating temperature of water heater appliance 100 from the normal operating temperature to the vacation operating temperature.

At step 420, controller 150 determines a vacation mode duration. As an example, a user can utilize user inputs 112 to input the vacation mode duration to controller 150. The vacation mode duration may be any suitable time interval, e.g., more than about fourteen days. Thus, when the user is going on a thirty day vacation, a user can utilize user inputs 112 to input a vacation mode duration of thirty days to controller 150.

At step 430, controller 150 calculates a sanitization schedule for water heater appliance 100, e.g., based at least in part on the vacation mode duration of step 420 and a sanitization time interval. The sanitization time interval corresponds to a frequency of sanitization operations of water heater appliance 100, e.g., time periods when water heater appliance 100 operates at the sanitization operating temperature in order to improve or maintain a sanitization of water within water heater appliance 100. In one exemplary embodiment, the sanitization time interval is less than about fourteen days.

The sanitization schedule of step 430 has at least one sanitization operation. As an example, controller 150 can determine a vacation mode duration of thirty days at step 420. Based upon the vacation mode duration and a sanitization time interval of fourteen days, controller 150 can calculate a sanitization schedule with two sanitation operations, e.g., on the fourteenth and the twenty-eighth day of the thirty day vacation mode duration. Thus, the at least one sanitization operation can include a plurality of sanitation operations, and the sanitation operations of the plurality of sanitation operations can be less than about fourteen days apart in the sanitization schedule.

At step 440, controller 150 starts the sanitization operation of water heater appliance 100 based upon the sanitization schedule. The operating temperature of water heater appliance 100 rises from the vacation operating temperature to a sanitization operating temperature during the at least one sanitation operation. The sanitization operating temperature can be any suitable temperature. In one exemplary embodiment, the sanitization operating temperature is greater than about one-hundred and twenty degrees Fahrenheit.

At step 450, controller 150 returns water heater appliance 100 to the vacation mode after completion of each sanitation operation of the at least one sanitization operation. Thus, e.g., controller 150 can initiate a sanitation operation at least every fourteen days in order to sanitize or maintain a sanitization of water within water heater appliance 100, and, after each sanitation operation, controller 150 can return water heater appliance 100 to the vacation mode in order to conserve energy.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a water heater appliance, comprising:

initiating a vacation mode of the water heater appliance in which an operating temperature of a stored tank of water in the water heater appliance is reduced from a normal operating temperature to a vacation operating temperature, the vacation operating temperature being between forty degrees Fahrenheit and sixty degrees Fahrenheit;

maintaining the stored tank of water in the water heater appliance in the vacation mode at the vacation operating temperature for a predetermined time period, the predetermined time period being less than fourteen days;

starting a thermal sanitization mode of the stored tank of water in the water heater appliance after the predetermined time period has elapsed, the operating temperature of the stored tank of water in the water heater appliance rising from the vacation operating temperature to a sanitization operating temperature in the thermal sanitization mode, the sanitization operating temperature being greater than one-hundred and twenty degrees Fahrenheit;

keeping the stored tank of water in the water heater appliance in the thermal sanitization mode at the sanitization operating temperature for a period of time; and returning the stored tank of water in the water heater appliance to the vacation mode after the period of time has elapsed, wherein a heating element of the water heater appliance is activated to raise the operating temperature of the stored tank of water from the vacation operating temperature to the sanitization operating temperature, and wherein water in the stored tank of water is not chemically treated during the thermal sanitization mode.

2. The method of claim 1, wherein the period of time is greater than one hour.

3. The method of claim 1, further comprising:

maintaining the water heater appliance in the vacation mode at the vacation operating temperature for an additional predetermined time period after said step of returning;

starting an additional thermal sanitization mode of the water heater appliance after the additional predetermined time period has elapsed;

keeping the water heater appliance in the additional thermal sanitization mode at the sanitization operating temperature for an additional period of time; and restoring the water heater appliance to the vacation mode after the additional period of time has elapsed.

4. A method for operating a water heater appliance, comprising:

initiating a vacation mode of a stored tank of water in the water heater appliance in which an operating temperature of the stored tank of water in the water heater appliance is reduced from a normal operating temperature to a vacation operating temperature, the vacation operating temperature being between forty degrees Fahrenheit and sixty degrees Fahrenheit;

determining a vacation mode duration;

calculating a sanitization schedule for the stored tank of water in the water heater appliance based at least in part on the vacation mode duration and a sanitization time interval, the sanitization time interval being less than fourteen days, the sanitization schedule having at least one thermal sanitization operation;

starting the thermal sanitization operation of the stored tank of water in the water heater appliance based upon the sanitization schedule, the operating temperature of the stored tank of water in the water heater appliance rising from the vacation operating temperature to a sanitization operating temperature during the at least one thermal sanitization operation, the sanitization operating temperature being greater than one-hundred and twenty degrees Fahrenheit; and returning the stored tank of water in the water heater appliance to the vacation mode after completion of each thermal sanitization operation of the at least one thermal sanitization operation, wherein a heating element of the water heater appliance is activated to raise the operating temperature of the stored tank of water from the vacation operating temperature to the sanitization operating temperature, and wherein water in the stored tank of water is not chemically treated during each thermal sanitization operation of the at least one thermal sanitization operation.

5. The method of claim 4, wherein the at least one thermal sanitization operation includes a plurality of sanitization operations, sanitization operations of the plurality of sanitization operations being less than fourteen days apart in the sanitization schedule.

6. The method of claim 4, wherein the vacation mode duration is greater than fourteen days.

7. A system for operating a water heater appliance, comprising:

a heating element positioned within the water heater appliance;

a user input; and a controller in communication with said heating element and said user input, said controller configured for:

receiving a vacation mode initiation signal from said user input;

initiating a vacation mode of a stored tank of water in the water heater appliance based upon the vacation mode initiation signal, an operating temperature of the stored tank of water in the water heater appliance being reduced from a normal operating temperature to a vacation operating temperature in the vacation mode, the vacation operating temperature being between forty degrees Fahrenheit and sixty degrees Fahrenheit;

activating said heating element after a predetermined period of time has elapsed after said step of initiating, the predetermined period of time being less than fourteen days, said heating element raising the operating temperature of the stored tank of water in the water heater appliance from the vacation operating temperature to a sanitization operating temperature during said step of activating, the sanitization operating temperature being greater than one-hundred and twenty degrees Fahrenheit; and adjusting the operating temperature of the stored tank of water in the water heater appliance in order to return the operating temperature of the stored tank of water in the water heater appliance from the sanitization operating temperature to the vacation operating temperature, and wherein water in the stored tank of water is not chemically treated during the vacation mode.

8. The system of claim 7, wherein said user input includes at least one of a control panel mounted to the water heater appliance and a mobile device.

9. The system of claim 7, wherein said controller is positioned within the water heater appliance.

10. The system of claim 7, wherein said controller is positioned away from the water heater appliance and communicates with the water heater appliance over a wireless connection.

11. The system of claim 7, wherein said controller is further configured for receiving a vacation mode termination signal from said user input and starting a normal operating mode of the water heater appliance based upon the vacation mode termination signal, the operating temperature of the water heater appliance being the normal operating temperature in the normal operating mode.

* * * * *